(12) United States Patent
Weinberg et al.

(10) Patent No.: US 9,076,163 B1
(45) Date of Patent: Jul. 7, 2015

(54) USER AD CREATION

(75) Inventors: Aitan Weinberg, New York, NY (US);
Christian Oestlien, New York, NY (US)

(73) Assignee: Google Inc., Mountain View, CA (US)

( * ) Notice: Subject to any disclaimer, the term of this patent is extended or adjusted under 35 U.S.C. 154(b) by 849 days.

(21) Appl. No.: 12/841,625

(22) Filed: Jul. 22, 2010

Related U.S. Application Data

(60) Provisional application No. 61/325,238, filed on Apr. 16, 2010.

(51) Int. Cl.
*G06Q 30/00* (2012.01)
*G06Q 30/02* (2012.01)

(52) U.S. Cl.
CPC .................................. *G06Q 30/0247* (2013.01)

(58) Field of Classification Search
CPC .................................................. G06Q 30/0247
USPC ............................... 705/14.66, 14.46; 725/32
See application file for complete search history.

(56) References Cited

U.S. PATENT DOCUMENTS

2006/0218577 A1 * 9/2006 Goodman et al. ............... 725/32
2010/0332330 A1 * 12/2010 Goel et al. .................. 705/14.66

* cited by examiner

*Primary Examiner* — James A Reagan
(74) *Attorney, Agent, or Firm* — Fish & Richardson P.C.

(57) ABSTRACT

Methods, systems, and apparatus, including computer programs encoded on a computer storage medium, are provided for handling user-created advertisements. In one aspect, a method includes receiving data from a first end user to create a first advertisement; receiving targeting criteria associated with the first advertisement, the targeting criteria indicating a second end user to whom the first advertisement is to be shown: receiving, from a client device, a first indication of the second end user browsing a webpage; and providing the first advertisement to be displayed to the second user on the webpage upon receiving the first indication.

17 Claims, 6 Drawing Sheets

USER AD CREATION

CROSS-REFERENCE TO RELATED APPLICATION

This application claims priority to a U.S. Provisional Application entitled USER AD CREATION, assigned Application No. 61/325,238, and filed Apr. 16, 2010, the entire contents of which are incorporated herein by reference.

BACKGROUND

This specification relates to data processing and content selection.

The Internet enables access to a wide variety of resources. For example, video, audio, webpages directed to particular subject matter, news articles, images, and other resources are accessible over the Internet. The wide variety of resources that are accessible over the Internet has enabled opportunities for advertisers to provide targeted advertisements with the resources. For example, an advertisement can be targeted for presentation with resources directed to subject matter to which the advertisement is relevant.

SUMMARY

A first user can create an advertisement to be shown to a particular second user (or group of users) selected by the first user. For example, the first user may wish to send the second user, who is a friend of the first user, a birthday greeting in the form of an advertisement. Data is received from the first user to use in creating the advertisement. The first user also provides information about the second user to whom the advertisement is to be shown, such as, for example, by providing an email address of the second user. When the second user is browsing the Internet, the advertisement created using the data provided by the first user is displayed for the second user.

In general, one innovative aspect of the subject matter described in this specification can be embodied in methods that include receiving data from a first end user to create a first advertisement; receiving targeting criteria associated with the first advertisement, the targeting criteria indicating a second end user to whom the first advertisement is to be shown; receiving, from a client device, a first indication of the second end user browsing a webpage; and providing the first advertisement to be displayed to the second user on the webpage upon receiving the first indication.

These and other implementations can each optionally include one or more of the following features. For example, the methods can include receiving a request from the webpage for one or more advertisements, with the request including one or more keywords; confirming that the second end user indicated in the targeting criteria is browsing the webpage; and selecting the first advertisement in response to the request even when the first advertisement is not responsive to the one or more keywords. The methods may further include selecting one or more second advertisements that are responsive to the one or more keywords provided in the request, where the one or more second advertisements and the first advertisement are each associated with a corresponding revenue amount; ranking the first advertisement and the one or more second advertisements based on their corresponding revenue amounts; and providing the first advertisement to be displayed to the second end user on the webpage upon determining that the first advertisement has a higher corresponding revenue amount than the corresponding revenue amount for each of the one or more second advertisements. Other implementations may include corresponding systems, apparatus, and computer programs, configured to perform the actions of the methods, encoded on computer storage devices.

Another innovative aspect of the subject matter described in this specification can be implemented by methods that include the actions of receiving a first indication from a first end user indicating that the first end user has requested to receive advertisements targeted to the first end user; receiving data from a second end user to create a first advertisement; receiving targeting criteria associated with the first advertisement, the targeting criteria indicating the first end user; receiving, from a client device, a second indication of the first end user browsing a webpage; and providing the first advertisement to be displayed to the first end user on the webpage upon receiving the second indication. Other implementations may include corresponding systems, apparatus, and computer programs, configured to perform the actions of the methods, encoded on computer storage devices.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
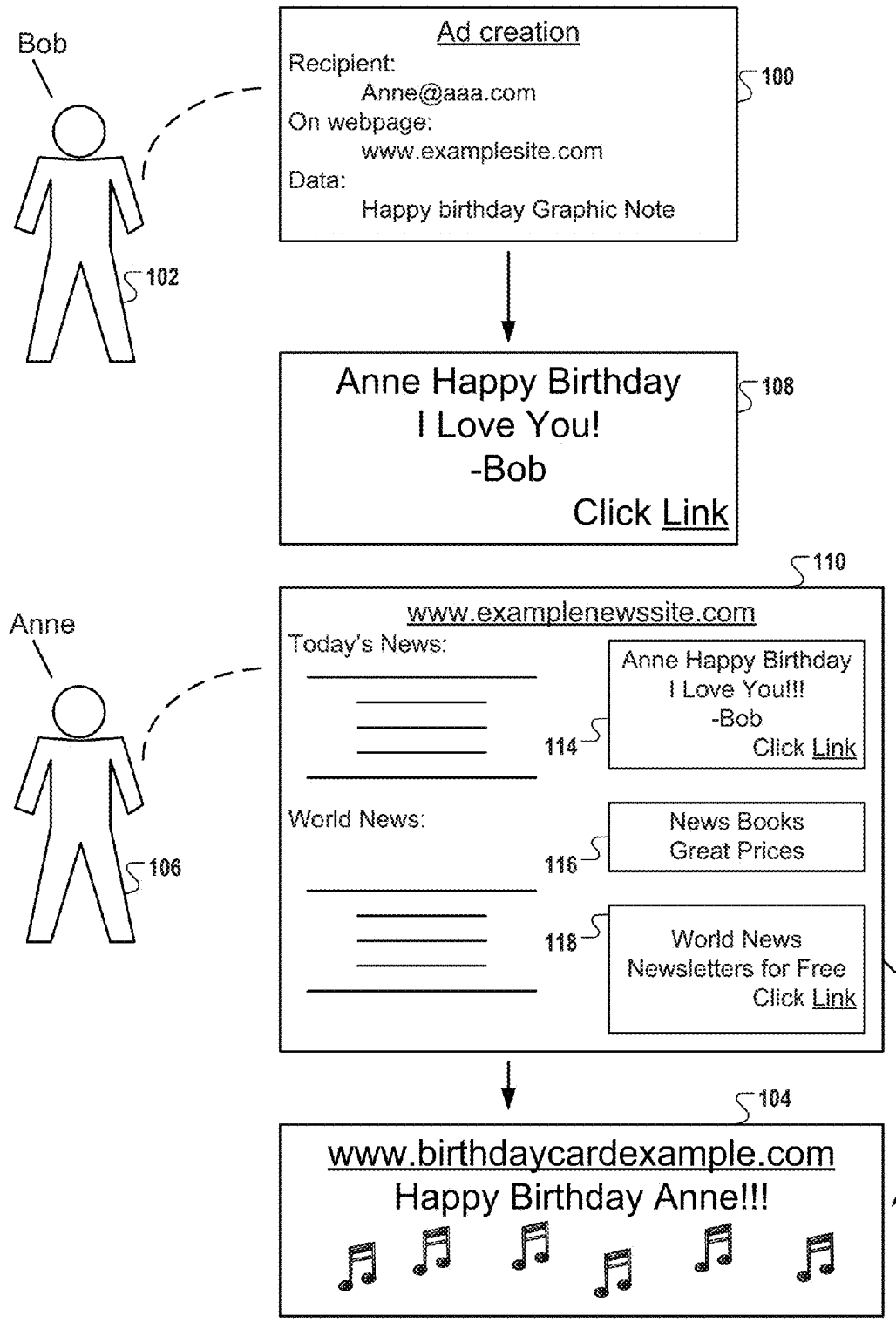
FIGS. 1A and 1B shows example webpages associated with creating and displaying user created advertisements.

FIG. 1A shows an example webpage 100 that allows a user Bob 102 to create an advertisement 108. The advertisement 108 can be created and shown to any other user who Bob 102 selects as the recipient for the advertisement. The advertisement 108 is displayed for the user selected by Bob 102 on a webpage browsed by the user. The advertisement 108 is displayed on the webpage, regardless of whether the advertisement includes content that is relevant to the webpage. For example, Bob 102 may create an advertisement 108 to be shown to his wife Anne 106 whenever she is on a particular webpage. In some implementations, the advertisement can be displayed on a television, an application on a mobile device, or on a webpage on a browser on the mobile device.

An ad creation webpage 100 receives targeting criteria from Bob 102 used to create the advertisement 108. The targeting criteria include recipient information, which can include an email address of the user to whom the advertisement 108 is targeted. In this example, the email address indicated by Bob 102 is anne@aaaexample.com. Bob 102 has selected an authenticated user as the recipient. An authenticated user is one who Bob 102 has explicitly chosen by, in this example, providing the email address. Bob 102 can alternatively indicate multiple recipients by providing their email addresses. These users are authenticated users as well.

Bob 102 can also indicate that unauthenticated users may receive the advertisement 108. An unauthenticated user is one who is not explicitly identified by an identifier such as a name or an email address by the user creating the advertisement. For example, the user can select unauthenticated users by indicating everyone in the user's social network who has indicated a willingness to receive advertisements created by the user. This willingness may be indicated, for example, through a flag in a webpage cookie stored on a computer used by a party who is willing to receive user-created advertisements.

In one simple example, if Bob 102 belongs to social network A, then Bob 102 can indicate the recipients as everyone in social network A. Therefore, if Bob 102 and ten other people belong to social network A, Bob 102 can indicate that the advertisement 108 is to be provided to everyone in social network A, which includes all ten users other than Bob. Bob 102 can also indicate further that the users who are to receive the advertisement 108 must share an acquaintance relationship with Bob 102 in the social network A.

For example, suppose Bob 102, Anne 106 and George are all on social network A, that Bob 102 and Anne 106 are friends on the social network, and that Bob 102 and George are not friends on the social network. If Bob 102 indicates that users who receive the advertisement 108 have to be in the same social network and also must share an acquaintance relationship with him, then, in this example, George would not be eligible to receive the advertisement 108 since Bob and George do not share an acquaintance relationship, here being friends, in social network A. Anne, however, would be eligible since Bob and Anne share an acquaintance relationship.

The targeting criteria can also indicate that the advertisement 108 is only to be shown to the user if the user is browsing the Internet. In this example, Bob 102 has indicated that the advertisement 108 should be shown to Anne 106 when Anne 106 is on the webpage www.examplesite.com. Alternatively, Bob 102 could have indicated that any time Anne 106 was browsing the web, the advertisement 108 should be shown to her regardless of the webpage. Bob 102 can also indicate a search engine webpage or any third-party publisher webpage as the targeting criteria. Bob 102 can also indicate any of the targeting criteria such as geo targeting, time of day, keyword targeting, day of week, and the like. For example, Bob 102 can indicate that Anne should only be shown his advertisement on Tuesdays between 9:00 am and 11:00 am and only in the United States.

Bob 102 can also provide data used to create the advertisement 108 using the ad creation webpage 100. The data can include any text to include with the advertisement 108, graphics, videos, as well as a link to a landing page associated with the advertisement 108. The data can also include items on other webpages such as a web album. Bob 102 can provide a link to the webpage for the web album. In this example, the data that Bob 102 has provided includes a Happy birthday graphic, as well as a note that says "Anne Happy Birthday, I love you!" Bob 102 has also provided a link to a third party webpage that includes a birthday card.

Bob 102 can also indicate a cost-per-click (CPC) amount to associate with the advertisement 108. The CPC amount is used when determining which advertisements are to be displayed on a webpage, as will be explained in greater detail below. In this example, suppose Bob 102 indicates a CPC amount of $10. Therefore, whenever Anne clicks on the advertisement 108, Bob 102 is charged $10.

Bob 102 can alternatively indicate a cost per thousand impressions (CPM) amount. This amount is how much Bob 102 will pay for every thousand impressions of the advertisement 108. For example, Bob 102 can indicate a CPM amount of $20.

Bob 102 can also indicate a campaign amount that is a total amount that Bob 102 wants to spend on the advertisement 108 being shown. For example, Bob 102 can indicate a campaign amount of $40. Therefore, using the CPM example noted above, once the advertisement 108 is shown 2000 times, the campaign amount is depleted and the advertisement 108 is no longer eligible to be provided in response to a search request.

Bob 102 can also indicate that no cost is to be associated with the advertisement 108, such that Bob is never charged when Anne clicks on the advertisement 108.

Figure 2:
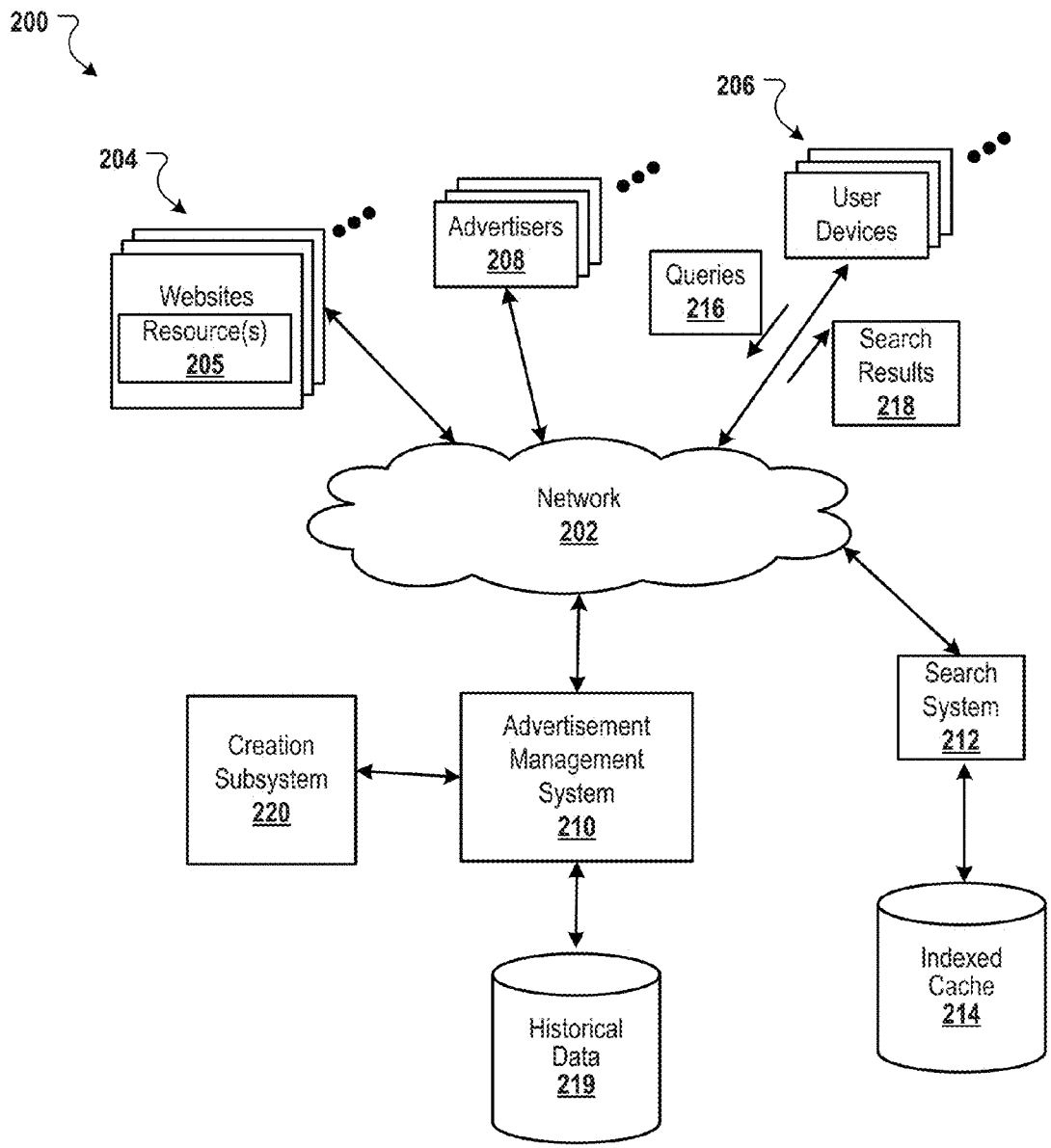
FIG. 2 is a block diagram of an example advertisement system environment.

An ad creation subsystem, such as the one in FIG. 2, receives the data and creates the advertisement 108 using the data. A monitoring subsystem can then detect any time that Anne 106 is browsing the Internet. For example, when Anne is on the webpage www.examplenewssite.com 108, the monitoring subsystem can determine that Anne 106 is browsing the webpage indicated in the targeting criteria.

An advertisement system that includes the ad creation subsystem can receive a request from the webpage www.examplenewssite.com 108 for one or more advertisements to be provided for display on the webpage 108. The request can include one or more keywords. In this example, the request may include keywords such as "news" and "word." The advertisement system then can identify one or more potential advertisements that are responsive to the keywords in response to the request. For example, the advertisement system can identify two advertisements about news. The monitoring subsystem can also provide the advertisement 108 to the advertisement system to be included as one of the potential advertisements to be displayed on the webpage 108. Even though the advertisement 108 is not associated with news, or world news, because the targeting criteria were satisfied, the advertisement 108 is selected as one of the potential advertisings.

The advertisement system can then rank the potential advertisement and select the top ranking ads to be provided to the webpage 108. In this example, suppose the two news advertisements were associated with a CPC amount of $0.50, and $0.60, respectively. In order to be selected for display on the webpage 110, the advertisement 108 needed to have a higher CPC than the other advertisements that were not displayed.

When Anne 106 is browsing the webpage 110, she will see the advertisement 108. If she clicks on the advertisement 108, she will be taken to a landing page 104. In this example, the landing page is a webpage including a birthday card. When Anne 106 clicked on the advertisement 108, Bob 102 was charged the CPC amount of $10. Even though the advertisement 108 has no relevance to the webpage 108, since the webpage is about news, the advertisement 108 is selected as one of the advertisements because of the high CPC amount. A user can therefore select a high CPC in order to make sure that the intended recipient is provided the advertisement, regardless of the content of the webpage on which the advertisement is provided.

In some implementations, when only one advertisement is requested to be presented on a webpage, the webpage will give priority to advertisements that have satisfied targeting criteria of users over advertisements that are merely responsive to the webpage, even if the advertisements that are responsive to the webpage are associated with a higher CPC. For example, if Bob 102 had associated $0 as the CPC amount with his advertisement, and the webpage 108 had only requested one advertisement, Bob's advertisement would still be the one identified and provided to be displayed on the webpage 108 because the targeting criteria of his advertisement was satisfied. His advertisement is the only one presented and he is not charged when Anne 106 clicks on the advertisement.

In some implementations, users can create a blacklist of other users from whom they do not want to receive advertisements. For example, if Bob 102 indicates that the advertisement 108 is to be provided to anyone in his social network, and Andy has indicated that he does not want to receive advertisements from Bob 102, then the system will not provide the advertisement 108 to Andy. Andy may block advertisements from Bob 102 by providing some form of identification of Bob, such as, for example, Bob's social network ID or email address.

Figure 1B:
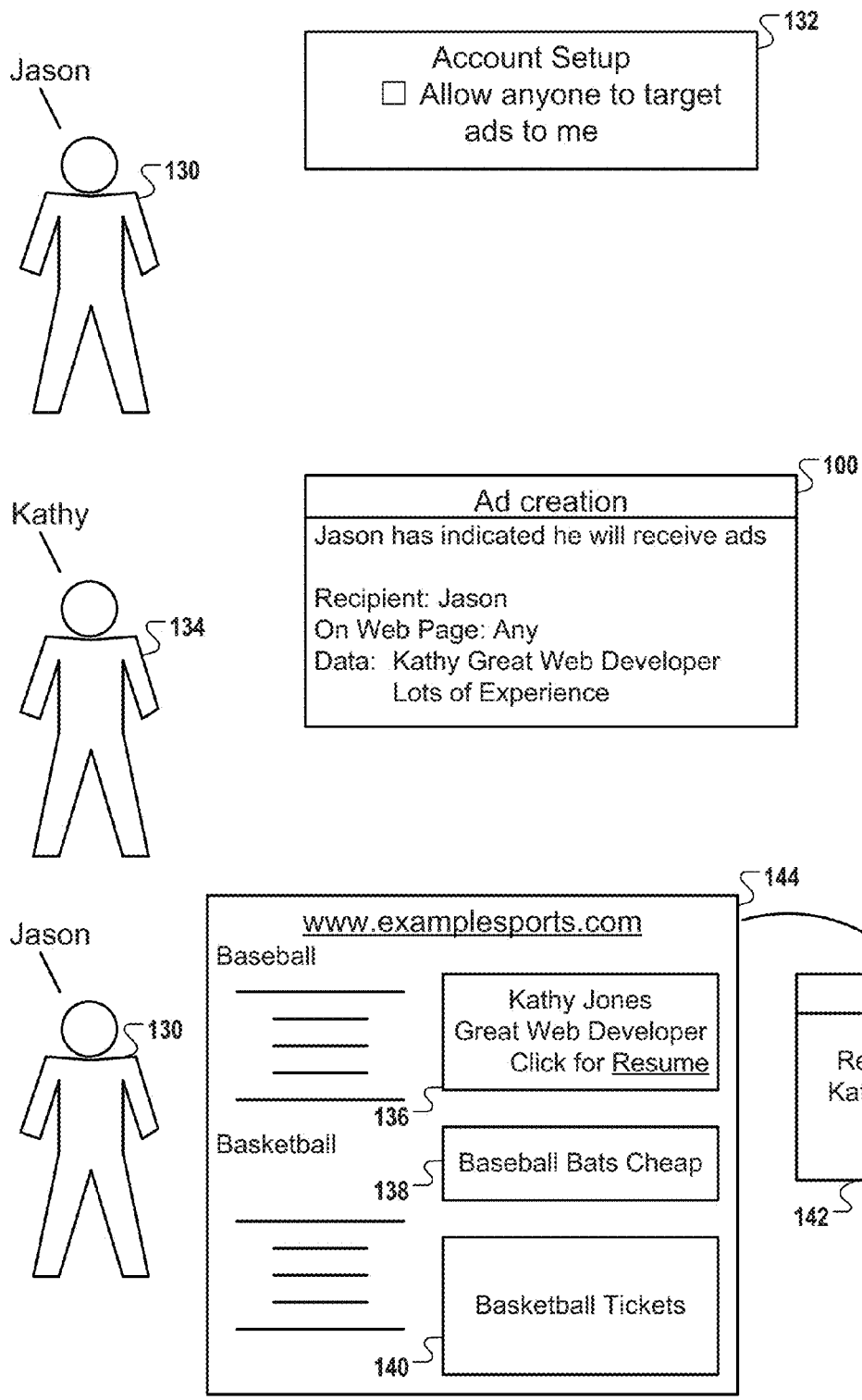

FIG. 1B illustrates another example of a first user allowing other users to target advertisements to the first user. Jason 130 is a user and may use an account setup webpage 132 provided by the advertisement system to indicate that other users can target advertisement to him. For example, Jason 130 may be the head of a software company and may think he can use this method to meet potential employees.

Kathy 134 may receive an indication from the advertisement system that specific users have indicated that advertisements can be targeted to them. The indication received from the advertisement system can include specifics about the individuals, such as their name, email address, and employer, as well as the type of advertisements that can be targeted to them. For example, she can see that Jason 130 has indicated that he will receive advertisements that include resumes.

Kathy 134 can use the ad creation webpage 100 to create an advertisement. She can indicate the recipient as Jason 130. She can either use an email address if the advertisement system provides an email address, or she can be provided with a list of users who have indicated that they will receive advertisements. In certain implementations, Kathy 134 is not provided with any personal information about Jason 130. Rather, only the advertisement system knows his email address. In other implementations, the person's name may also not be shown, and the user may only be informed that a person in a particular region or city has indicated willingness to receive advertisements directed to a certain category. For example, a person in Atlanta that owns a law firm may have indicated that he will receive advertisements that include resumes from other users.

In this example, Kathy 134 indicates that the targeting criteria include any webpage that Jason 130 is browsing, and the data she provides can include "Great Web Developer. Click for resume." And she can also provide a copy of her resume using the ad creation webpage 100.

The creation subsystem receives the data she provided and creates the advertisement 136. The advertisement system then determines when Jason 130 is browsing any webpage. For example, when Jason 130 is on webpage www.examplesports.com 144, a request can be sent from the webpage 144 to the advertisement system for one or more advertisements. The request can include one or more keywords. For example, the keywords can include "baseball" and "basketball." The creation subsystem knows that Jason 130 is browsing webpage 144 and can provide this information to the advertisement system. The advertisement system can then select advertisements that are responsive to the keywords "baseball" and basketball" as potential advertisements to be provided to the webpage 144. The advertisement system can also select advertisement 136 because the targeting criteria of the advertisement 136 were met. Therefore, advertisement 136 is selected as one of the potential advertisements. The advertisement system can then rank the potential advertisements based on the CPC amount and then select the advertisements based on a ranking of the advertisements. In this example, advertisement 136 had the highest CPC amount of $20. The advertisement system can select advertisement 136, as well as advertisement 138 and 140 to be displayed on the webpage 144.

When the user Jason 130 is browsing the webpage 144, Kathy's advertisement 136 is the top advertisement. Jason 130 can then click on her advertisement and be provided with a copy of her resume 142 to download. Alternatively, Jason 130 can be taken to another webpage that includes a copy of her resume. Upon selection of the advertisement 136, Kathy 134 is charged the CPC amount of $20 that she indicated when she created the advertisement 136.

In some implementations, users can create a blacklist of other users from whom they do not want to receive advertisements. For example, Jason 130 can indicate to receive advertisements from anyone except Jenny Joy and provide some form of identification of Jenny, such as Jenny's email address. In some implementations, users can create a whitelist of other users from whom they do want to receive advertisement. For example, Jason 130 can alternatively request that only users in his social network be able to target advertisements to him. For example, if Jason 130 has a Twitter account, he can request anyone that he is following to be able to target advertisements to him. Jason 130 can provide his Twitter ID or his email address for this purpose.

In some implementations, the users that the advertisements are targeted towards must provide express approval of the advertisements being targeted to them. In other implementations, if the user is in the same social network as the user creating the advertisement, no express approval is needed.

In some implementations, a user can select everyone in their contact list as the intended recipient of an advertisement. For example, Bob 102 can select everyone in his email contact list. The creation subsystem can determine the amount of email traffic between Bob 102 and each of the contacts in Bob's email contact list. Based on the amount of traffic, the users can be selected as being able to receive the advertisements without having to provide express approval. For example, suppose Nancy is in Bob's contact list. If the creation subsystem determines that Bob 102 and Nancy exchange emails over a predetermined threshold every day or week, then Nancy can be selected as one of the recipients of any ads that Bob 102 creates and Nancy does not have to provide express approval to receive the advertisements.

In some implementations, the activity of the users is tracked on the Internet. The activity can be tracked in either a private forum or a public forum. For example, activity that may be tracked includes the topics the users write about on public forums, or the messages they send to their friends in a social network that are publicly available. Users can be compensated for the volume and quality of their comments/ratings, or get some sort of revenue sharing attribution from ads they ad-cast. That revenue sharing may be based on a points system, money, or credit towards buying advertisements for themselves or to give to their friends. In some implementations, this can be extended to a business with a follower list.

In some implementations, a user can be identified as an influencer, an expert, an aficionado, or the like with a designated ranking of an expert level in a specific area. The user's ranking, which may be made publicly available, may be increased as the amount of useful content generated by the user increases.

FIG. 2 is a block diagram of an example environment 200 in which an advertisement management system 210 manages advertising services. The example environment 200 includes a network 202 such as a local area network (LAN), wide area network (WAN), the Internet, or a combination thereof. The network 202 connects websites 204, user devices 206, advertisers 208, and the advertisement management system 210. The example environment 200 may include many thousands of websites 204, user devices 206, and advertisers 208.

A website 204 is one or more resources 205 associated with a domain name and hosted by one or more servers. An example website is a collection of webpages formatted in hypertext markup language (HTML) that can contain text, images, multimedia content, and programming elements, such as scripts. Each website 204 is maintained by a publisher, which is an entity that manages and/or owns the website 204.

A resource 205 is any data that can be provided over the network 202 and that is associated with a resource address. Resources include HTML pages, word processing documents, portable document format (PDF) documents, images, video, and feed sources, to name only a few. The resources can include content, e.g., words, phrases, images and audio that may include embedded information (such as meta-information in hyperlinks) and/or embedded instructions (such as JavaScript scripts).

A user device 206 is an electronic device that is under control of a user and is capable of requesting and receiving resources 205 over the network 202. Example user devices 206 include personal computers, mobile communication devices, and other devices that can send and receive data over the network 202. A user device 206 typically includes a user application, such as a web browser, to facilitate the sending and receiving of data over the network 202.

A user device 206 can request resources 205 from a website 204. In turn, data representing the resource 205 can be provided to the user device 206 for presentation by the user device 206. The data representing the resource 205 can also include data specifying a portion of the resource or a portion of a user display (e.g., a presentation location of a pop-up window) in which advertisements can be presented. These specified portions of the resource or user display in which advertisements can be presented are referred to as advertisement slots.

To facilitate searching of these resources, a search system 212 identifies the resources by crawling and indexing the resources provided by the publishers on the websites 204. The indexed and, optionally, cached copies of the resources are stored in an indexed cache 214.

User devices 206 submit search queries 216 to the search system 212 over the network 202. In response, the search system 212 accesses the indexed cache 214 to identify resources that are relevant to the search query 216. The search system 212 identifies the resources in the form of search results 218 and returns the search results 218 to the user devices 206 in search results pages.

A search result 218 is data generated by the search system 212 that identifies a resource that is responsive to a particular search query, and includes a link to the resource. An example search result 218 can include a webpage title, a snippet of text or a portion of an image extracted from the webpage, and the URL of the webpage. Search results pages can also include one or more advertisement slots in which advertisements can be presented.

When a resource 205 or search results 218 are requested by a user device 206, the advertisement management system 210 receives a request for advertisements to be provided with the resource or search results. The request for advertisements can include characteristics of the advertisement slots that are defined for the requested resource or search results page. Therefore, the advertisement management system 210 can use the characteristics to select advertisements for presentation in the advertisement slots.

For example, a reference (e.g., URL) to the resource for which the advertisement slot is defined, a size of the advertisement slot, and/or media types that are available for presentation in the advertisement slot can be provided to the advertisement management system 210. Similarly, a search query 216 for which search results are requested can also be provided to the advertisement management system 210.

In response to the request for advertisements, the advertisement management system 210 can select, for presentation, advertisements having characteristics matching the characteristics of advertisement slots and that are identified as relevant to the search queries 216. The data representing the request for advertisements as well as data representing the selected advertisements, user actions (e.g., selections, conversions) taken in response to the selected advertisements being presented can be stored in a historical data store 219.

Based on data included in the request for advertisements, the advertisement management system 210 can select advertisements that are eligible to be provided in response to the request. For example, eligible advertisements can include advertisements having characteristics matching the characteristics of advertisement slots and that are identified as relevant to specified resource keywords or search queries 216. In some implementations, advertisements having targeting keywords that match the resource keywords or the search query 216 are selected as eligible advertisements by the advertisement management system 210.

A targeting keyword can match a resource keyword or a search query 216 by having the same textual content ("text") as the resource keyword or search query 216. For example, an advertisement associated with the targeting keyword "tennis" can be an eligible advertisement for an advertisement request including the resource keyword "tennis" Similarly, the advertisement can be selected as an eligible advertisement for an advertisement request including the search query "tennis" A targeting keyword can also match a resource keyword or a search query 216 by having text that is identified as being relevant to a targeting keyword or search query 216 despite having different text than the targeting keyword. For example, an advertisement having the targeting keyword "tennis" may also be selected as an eligible advertisement for an advertisement request including a resource keyword or search query for "sports" because tennis is a type of sport, and therefore, is relevant to the term "tennis."

The advertisement management system 210 can select the eligible advertisements that are provided for presentation in advertisement slots of a resource or search results page based on results of an auction. For example, the advertisement management system 210 can receive bids from advertisers and allocate the advertisement slots to the highest bidders at the conclusion of the auction. The bids are amounts that the advertisers are willing to pay for presentation (or selection) of their advertisement with a resource or search results page. For example, a bid can specify an amount that an advertiser is willing to pay for each 1000 impressions (i.e., presentations) of the advertisement, referred to as a CPM bid. Alternatively, the bid can specify an amount that the advertiser is willing to pay for a selection (i.e., a click-through) of the advertisement or a "conversion" following selection of the advertisement.

A conversion occurs when a user performs a particular action related to an advertisement provided with a resource or search results page. What constitutes a conversion may vary from case to case and can be determined in a variety of ways.

For example, a conversion may occur when a user clicks on an advertisement, is referred to a webpage, and consummates a purchase there before leaving that webpage. A conversion can also be defined by an advertiser to be any measurable/observable user action such as, for example, downloading a white paper, navigating to at least a given depth of a website, viewing at least a certain number of webpages, spending at least a predetermined amount of time on a website or webpage, registering on a website. Other actions that constitute a conversion can also be used.

The highest bidders can be determined based on the bids alone, or based on the bids of each bidder being multiplied by one or more signals, such as quality scores derived from advertisement performance and landing page scores.

Users of the advertisement system can also create advertisements. To facilitate creation of the advertisements, the advertisement management system 210 includes a creation subsystem 220. The creation subsystem 220 receives data from a first end user to create a first advertisement. The creation subsystem 220 can receive targeting criteria associated with the advertisement, the targeting criteria indicating a second end user that the advertisement is to be shown. The creation subsystem 220 can receive, from a client device 206, a first indication of the second end user browsing a webpage, and provide the advertisement to be displayed on the webpage to the second end user upon receiving the indication.

In some implementations, a user can indicate that anyone in his social network can receive the advertisements. A social network (e.g., FACEBOOK, MYSPACE, ORKUT, LINKEDIN, or TWITTER) can be an online system that provides a forum for users who are geographically separated from each other to interact with one another, where those users have defined a relationship between one another. A user of a social network can have a profile page (e.g., a webpage on the social network) that provides information about the user to other users of the social network. A profile can include information regarding a user's acquaintance relationships (e.g., friends, colleagues, schoolmates) on the social network. Users can control who can view their information by identifying particular relationships with other users, and a user can also define relationships with new users from the group of other users who have relationships with users with whom the user already has relationships.

The social network can also have a mobile component. A mobile profile, mobile location, mobile data, applications shared, games shared, music shared, and call, chat, and short message service (SMS) information can also be used for a social graph analysis. A social graph represents entities and interactions (connections) between users/entities in the social network. Users are represented as nodes in the graph and interactions are represented as lines connecting the nodes. Each of the nodes and connections can be stored as objects or otherwise defined in a data structure stored on a computer-readable storage device. Interactions, for example, can involve communications between two individual users. A pair of users may become involved in multiple interactions. The social graph analysis can be built with proper privacy-preserving restrictions, without Personally Identifiable Information (PII), and with user permission.

Figure 3:
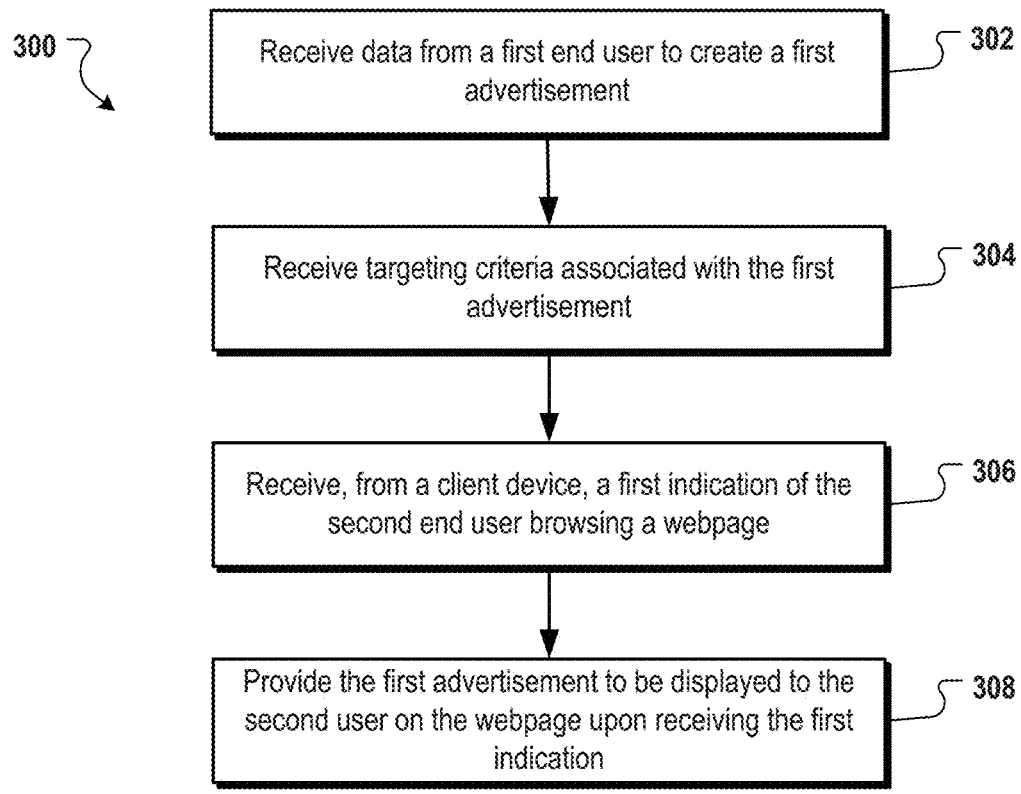
FIG. 3 is a block diagram of an example process flow for creating advertisements.

FIG. 3 is a block diagram of an example process flow 300 for providing user-created advertisements. According to the process 300, data is received from a first end user to create a first advertisement. Targeting criteria associated with the advertisement are also received, the targeting criteria indicating a second end user to whom the advertisement is to be shown. A first indication of the second end user browsing a webpage is received from a client device, and the advertisement is provided to be displayed on the webpage to the second end user upon receiving the indication.

The process 300 can be implemented, for example, by the creation subsystem 220 and/or the advertisement management system 210 of FIG. 2. In some implementations, the creation subsystem 220 is a data processing apparatus that includes one or more processors that are configured to perform actions of the process 300. In other implementations, a computer readable medium can include instructions that when executed by a computer cause the computer to perform actions of the process 300.

Data is received from a first end user to create a first advertisement (302). In some implementations, the data can include text, image files, video files, as well as one or more links to landing pages that can be used as part of the advertisement. In some implementations, the format of the data can be selected by the first end user. For example, Bob can select where the text should appear in the advertisement, where image or video files should appear, and where the link should appear. In other implementations, the advertisement management system 210 provides a template for the advertisement and the user provides the data to populate the template. For example, the advertisement management system 210 can provide a template to Bob asking for a line of text, an image file, and a URL. The data can also include a CPC or a CPM amount to associate with the advertisement.

In some implementations, the advertisement management system 210 creates an advertisement using the data provided by the first end user. The advertisement includes the data provided by the first end user.

In some implementations, the advertisement is not associated with a good or service that is for sale, and the end user can only create advertisements that are not associated with either a good or service for sale. For example, Bob may only be permitted to create an advertisement that relates to something that is not for sale.

In some implementations, the first end user is not an advertiser. An advertiser is an entity having a business that includes the promotion of a product or service. The advertisement management system 210 can request information from the first end user to determine if the first end user is an advertiser.

Targeting criteria associated with the first advertisement is received, the targeting criteria indicating a second end user to whom the first advertisement is to be shown (304). In some implementations, the targeting criteria can include an email address of the user to whom the advertisement is targeted. The targeting criteria can also include other identifiable information, such as the user's full name. The targeting criteria can alternatively include an IP address of a computer as a recipient.

A first indication of the second end user browsing a webpage is received from a client device (306). In some implementations, the advertisement management system 210 can track users that are browsing specific websites. For example, the advertisement management system 210 can track users that are browsing third-party provider sites or search engine sites provided by the advertisement management system 210 by requesting each user to provide an email address prior to logging on to the webpage. For example, suppose Jane Smith is browsing a search engine website. The search engine website may require her to provide her email address prior to using the search engine website.

In some implementations, the webpage is a webpage of a third-party publisher. For example, the webpage can be www.cnn.com or www.espn.com. In other implementations, the webpage is of a search engine site. For example, the webpage can be www.google.com.

In some implementations, a request for one or more advertisements is received from the webpage the user is browsing. The request also can include one or more keywords. For example, the webpage can be a webpage about animals, and the keywords can be keywords such as "dog" and "cat."

The advertisement management system 210 can determine that the second end user indicated in the targeting criteria is browsing the webpage. For example, the advertisement management system 210 can determine that the email address of the second user is the same as the email address (e.g., janesmith@example.com) provided by the first user as the targeting criteria.

The first advertisement is then identified in response to the request, even though the first advertisement is not responsive to the one or more keywords. The first advertisement is identified only because the targeting criteria are met. One or more second advertisements can also be identified in response to the request. For example, Bob's advertisement that he created is identified in response to the request, even though the advertisement is not associated with any keywords that match the keywords in the request, because the user's email address ("janesmith@example.com") satisfies the recipient criteria Bob provided.

The one or more second advertisements are responsive to the one or more keywords provided in the request. For example, suppose an advertisement about dog food is associated with keywords such as "dog" and "food," and has a CPC amount of $0.60. This advertisement is responsive to the keyword "dog" that is part of the request, because the keyword "dog" associated with the advertisement matches the keyword "dog" that is part of the request. The dog food advertisement is selected as an advertisement. Suppose another advertisement about cats is associated with keywords such as "cat" and "claws" and has a CPC amount of $0.40.

In some implementations, the first advertisement and the one or more second advertisements are ranked based on the corresponding revenue amount for each. For example, suppose Bob's advertisement was associated with a CPC amount of $0.90. Bob's advertisement is ranked along with the dog food advertisement and the advertisement about cats. Since the CPC for Bob's advertisement is $0.90, and is higher than both the CPC associated with the dog food advertisement, which is $0.50, and the CPC associated with the advertisement about cats, which is $0.40, Bob's advertisement is ranked first, and is followed first by the advertisement about dog food and then by the advertisement about cats.

In some implementations, the advertisement management system 210 provides the first advertisement to be displayed to the second end user on the webpage upon determining that the first advertisement has a higher corresponding revenue amount than the corresponding revenue amount for each of the one or more second advertisements. Thus, in the example discussed above, Bob's advertisement is provided to be displayed on the webpage about animals since Bob's advertisement has the highest CPC amount.

The first advertisement is provided to be displayed to the second user on the webpage upon receiving the first indication (308). In some implementations, the first advertisement is displayed alone or with other advertisements. For example, if the webpage requested a single advertisement, then Bob's advertisement is the only one provided to be displayed, since his has the highest ranking. However, if the webpage requested two advertisements, then the advertisement management system 210 provides Bob's advertisement as well as the advertisement about dog food, since it was ranked second after Bob's advertisement.

In some implementations, the advertisement management system receives an indication from the second user to receive the first advertisement. The indication can include data that the first end user and the second end user are in the same social network.

Figure 4:
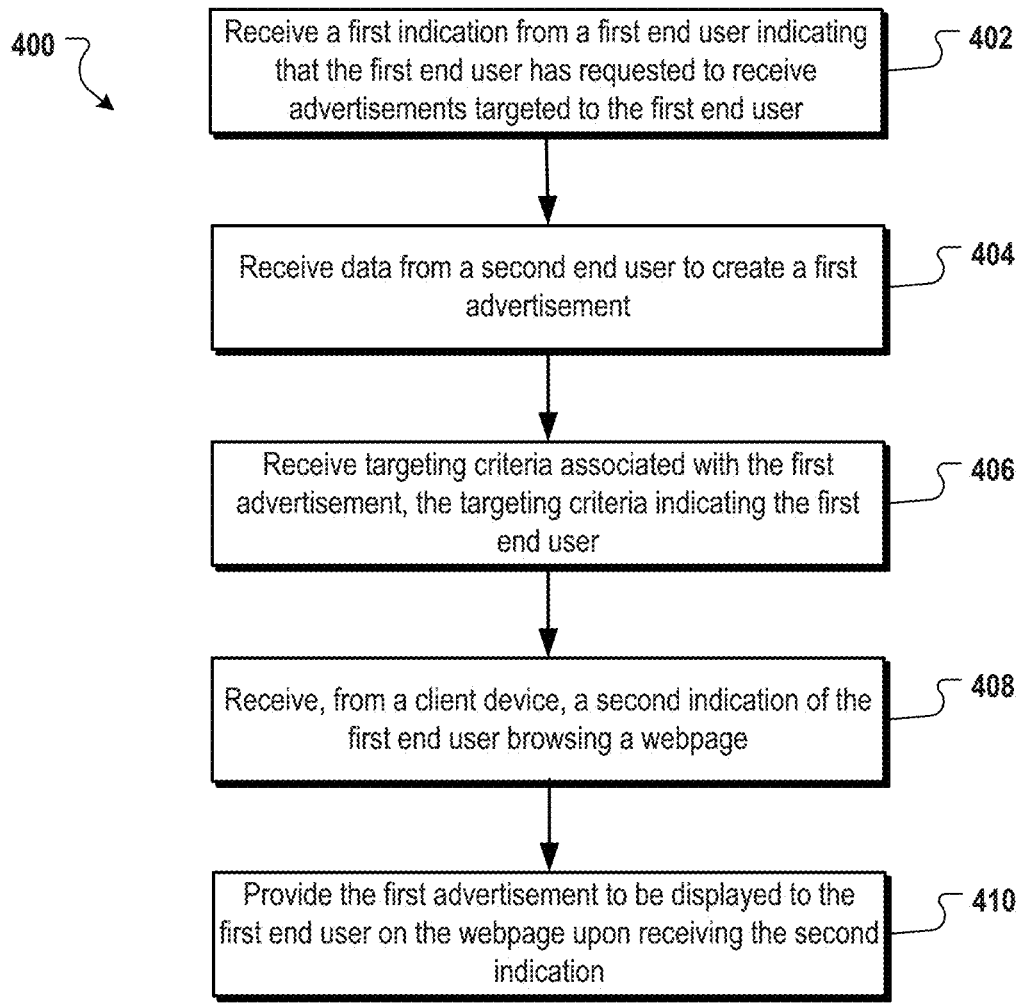
FIG. 4 is a block diagram of another example process flow for creating advertisements.

FIG. 4 is a block diagram of an example process flow 400 for providing user-created advertisements. According to the process 400, a first indication is received from a first end user indicating that the first end user has requested to receive advertisements targeted to the first user. Data is received from a second end user to create a first advertisement. Targeting criteria associated with the first advertisement is received, the targeting criteria indicating the first end user. A second indication of the first end user browsing a webpage is received from a client device, and the first advertisement is provided to be displayed on the webpage to the first end user upon receiving the second indication.

The process 400 can be implemented, for example, by the creation subsystem 220 and/or the advertisement management system of FIG. 2. In some implementations, the creation subsystem 220 is a data processing apparatus that includes one or more processors that are configured to perform actions of the process 400. In other implementations, a computer readable medium can include instructions that when executed by a computer cause the computer to perform actions of the process 400.

A first indication is received from a first end user indicating that the first end user has requested to receive advertisements targeted to the first end user (402). In some implementations, the first end user can provide the indication in a user profile. The indication provides knowledge to advertisers or non-advertisers that want to create advertisements that the particular first end user allows for advertisements to be targeted to him. Other end users can view a list of people that have allowed for ads to be targeted to them.

For example, suppose Claire is an end user and Claire runs a software company. Through the advertisement management system 210, Claire can allow other advertisers and non-advertisers to target ads to her. She can create a profile indicating that she wants to have advertisers targeted to her. Another end user Jeff may want to create an advertisement so Claire sees it, and the advertisement may include information about him, a resume, or anything else he wants to include.

Data is received from a second end user to create a first advertisement (404). In some implementations, the data can include text, image files, video files, as well as one or more URLs that can be used as part of the advertisement. For example, suppose Jeff wants to create an advertisement with his name, his photo and a link to a copy of his resume. Jeff can provide this data to be used to create the advertisement.

In some implementations, the advertisement management system 210 creates an advertisement associated with a first end user using the data provided by the first end user. The advertisement can include the text, files, or URLs provided by the first end user. For example, Jeff can provide text that includes "Jeff Smith, software developer, 7 years experience." He may also include an image file with his picture, as well as a link to his resume. The advertisement management system 210 can create the advertisement using the text, his picture and the link.

Targeting criteria associated with the first advertisement and indicating the first end user is received (406). In some implementations, the targeting criteria can include an email address of the user to whom the advertisement is targeted. The targeting criteria can also include other identifiable information such as the user's full name. In some implementations, the advertisement management system 210 can provide a list of individuals who have indicated that advertisements can be targeted to them, and the second end user can select from the list. For example, the advertisement management system 210 can provide a list to Jeff which includes Claire's name. Jeff can select Claire as the targeting criteria.

A second indication of the first end user browsing a webpage is received from a client device (408). As described above, the advertisement management system 210 can track users that are browsing webpages. For example, by requiring the users to provide an email address before browsing a third-party publisher webpage or using a search engine site. For example, suppose Claire was on www.google.com searching the Internet. The advertisement management system 210 requires her to provide her email address prior to using the site. Therefore, the advertisement management system 210 can determine when she is browsing a webpage.

The first advertisement is provided to be displayed to the first end user on the webpage upon receiving the second indication (410). In some implementations, if more than one advertisement has been requested from the webpage that the first end user is browsing, the advertisements that are responsive to the request are ranked along with the selected advertisement from the second user based on the CPC or CPM amount, as described above. For example, suppose Claire was on www.google.com and she performed a search for "hats." The search engine webpage will provide her with search results that are responsive to the query "hats" and the webpage will also request advertisements that are responsive to the keyword "hats." If the search engine webpage requests three advertisements from the advertisement management system 210, then the advertisement management system 210 will identify advertisements that are responsive to the keyword "hats" as well as Jeff's advertisement, even though Jeff's advertisement is not related to hats, because Claire's identification has satisfied the targeting criteria of Jeff's advertisement. Once the advertisements about hats are identified, they are ranked along with Jeff's advertisement based on the CPC or CPM amount as described above.

Figure 5:
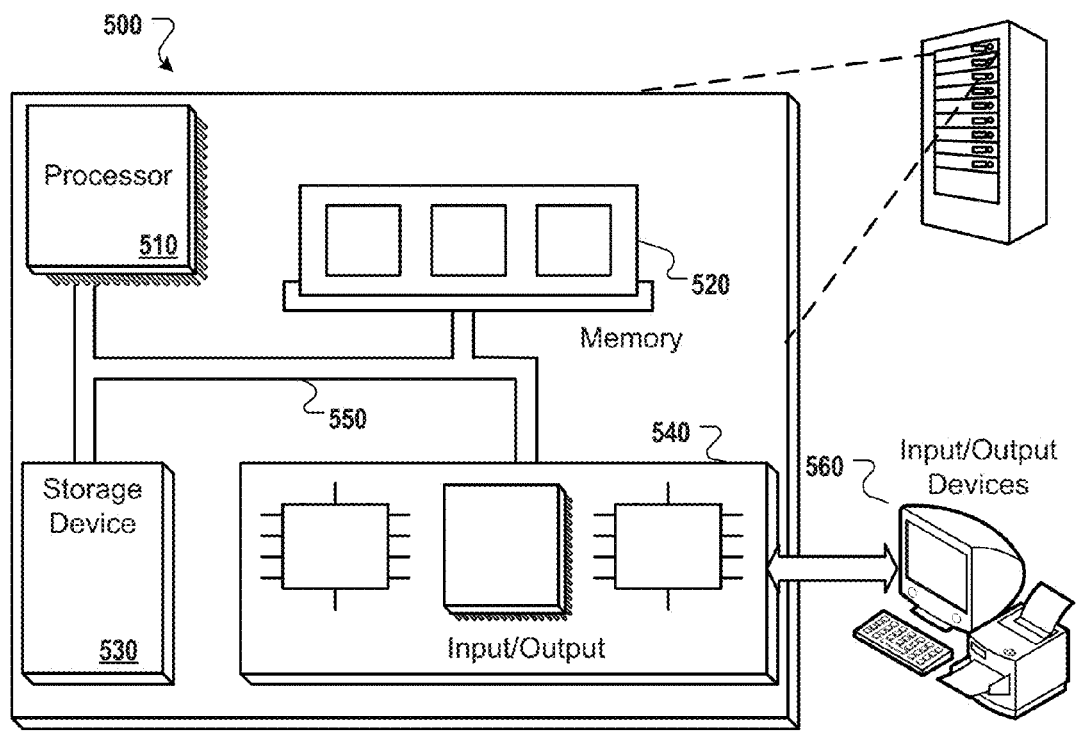
FIG. 5 is a block diagram of an example computer system that can be used to facilitate creation and providing of advertisements.

FIG. 5 is block diagram of an example computer system 500 that can be used to allocate resources in response to resource requests. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, and the like.

The creation subsystem 220 and/or advertisement management system 210 can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The creation subsystem 220 and/or advertisement management system 210 can be distributively implemented over a network, such as a server farm, or can be implemented in a single computer device.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving, by a computer from a first end user, information required to construct a first end user created advertisement;
receiving, from the first end user, recipient information that specifies a selection by the first end user of information indicative of one or more intended recipients of the first end user created advertisement;
receiving, from a client device and by the computer, an indication of a second end user browsing a webpage;
receiving a request from the webpage for one or more advertisements, the request including one or more keywords;
determining, based on the recipient information and information that identifies the second end user, that the second end user is one of the one or more intended recipients of the first end user created advertisement;
in response to determining that the second end user is one of the one or more intended recipients of the first end user created advertisement,
identifying the first end user created advertisement as a candidate for display in the web page, wherein the first end user created advertisement is identified as being the candidate whether or not one or more keywords of the first end user created advertisement match the one or more keywords associated with the request;
identifying one or more second advertisements that are candidates for display in the web page in response to the request, by the computer, wherein the one or more second advertisements are responsive to the one or more keywords provided in the request; and
selecting at least one of the one or more second advertisements or the first end user created advertisement for display to the second end user.

2. The method of claim 1, wherein the first end user created advertisement is not associated with a good or service that is available for sale.

3. The method of claim 1, wherein the first end user is not an advertiser.

4. The method of claim 1, wherein the webpage is a webpage of a third-party publisher.

5. The method of claim 1, wherein the webpage is a webpage of a search engine site.

6. The method of claim 1, wherein the first end user created advertisement is associated with an event.

7. The method of claim 1, wherein the recipient information includes one of an email address of the second end user or a social network to which the second end user belongs.

8. The method of claim 1, further comprising receiving from the first end user a revenue amount corresponding to the first end user created advertisement.

9. The method of claim 8, wherein the revenue amount corresponding to the first end user created advertisement is a cost-per-click amount.

10. The method of claim 1, further comprising receiving from the first end user, a campaign amount associated with the first end user created advertisement.

11. The method of claim 10, further comprising providing a third indication to the second end user indicating that the first end user has indicated a willingness to receive advertisements.

12. The method of claim 1, wherein the indication comprises a first indication, and wherein the method further comprises receiving a second indication from the second end user to receive the first end user created advertisement.

13. The method of claim 12, wherein the second indication is data indicating that the first end user and the second end user are in a same social network.

14. The method of claim 13, wherein the second indication is data indicating that the first end user and the second end user are in a same social network and share an acquaintance relationship in the same social network.

15. A computer-implemented method, comprising:
receiving, by a computer, a first indication from a first end user indicating that the first end user is willing to receive advertisements targeted to the first end user;
after receiving the first indication from the first end user indicating that the first end user is willing to receive advertisements targeted to the first end user,
receiving, by the computer from a second end user, information required to construct a second end user created advertisement;
receiving, from the second end user, recipient information that specifies that the first end user is an intended recipient of the second end user created advertisement;
receiving, by the computer and from a client device, a second indication of the first end user browsing a webpage;
determining, based on the recipient information, that the first end user is the intended recipient of the second end user created advertisement; and
providing, by the computer, the second end user created advertisement to be displayed to the first end user on the webpage upon receiving the second indication and based on receiving the first indication.

16. A non-transitory computer storage medium encoded with a computer program, the program comprising instructions that when executed by data processing apparatus cause the data processing apparatus to perform operations comprising:
receiving, from a first end user, information required to construct a first end user created advertisement;
receiving, from the first end user, recipient information that specifies a selection by the first end user of information indicative of one or more intended recipients of the first end user created advertisement;
receiving, from a client device, an indication of a second end user browsing a webpage;
receiving a request from the webpage for one or more advertisements, the request including one or more keywords;
determining, based on the recipient information and information that identifies the second end user, that the second end user is one of the one or more intended recipients of the first end user created advertisement;
in response to determining that the second end user is one of the one or more intended recipients of the first end user created advertisement,
identifying the first end user created advertisement as a candidate for display in the web page wherein the first end user created advertisement is identified as being the candidate whether or not one or more keywords of the first end user created advertisement match the one or more keywords associated with the request;

identifying one or more second advertisements that are candidates for display in the web page in response to the request, wherein the one or more second advertisements are responsive to the one or more keywords provided in the request; and selecting at least one of the one or more second advertisements or the first end user created advertisement for display to the second end user.

17. A system comprising:

one or more computers; and a computer-readable medium coupled to the one or more computers having instructions stored thereon which, when executed by the one or more computers, cause the one or more computers to perform operations comprising:

receiving, from a first end user, information required to construct a first end user created advertisement;

receiving, from the first end user, recipient information that specifies a selection by the first end user of information indicative of one or more intended recipients of the first end user created advertisement;

receiving, from a client device, an indication of a second end user browsing a webpage;

receiving a request from the webpage for one or more advertisements, the request including one or more keywords;

determining, based on the recipient information and information that identifies the second end user, that the second end user is one of the one or more intended recipients of the first end user created advertisement;

in response to determining that the second end user is one of the one or more intended recipients of the first end user created advertisement, identifying the first end user created advertisement as a candidate for display in the web page wherein the first end user created advertisement is identified as being the candidate whether or not one or more keywords of the first end user created advertisement match the one or more keywords associated with the request;

identifying one or more second advertisements that are candidates for display in the web page in response to the request, wherein the one or more second advertisements are responsive to the one or more keywords provided in the request; and selecting at least one of the one or more second advertisements or the first end user created advertisement for display to the second end user.

\* \* \* \* \*